US012587875B2

(12) United States Patent
Hong

(10) Patent No.: US 12,587,875 B2
(45) Date of Patent: Mar. 24, 2026

(54) METHOD, DEVICE AND STORAGE MEDIUM FOR DRIVE TEST

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 1165 days.

(21) Appl. No.: 17/611,024

(22) PCT Filed: May 14, 2019

(86) PCT No.: PCT/CN2019/086885
§ 371 (c)(1),
(2) Date: Nov. 12, 2021

(87) PCT Pub. No.: WO2020/227935
PCT Pub. Date: Nov. 19, 2020

(65) Prior Publication Data
US 2025/0324292 A1     Oct. 16, 2025

(51) Int. Cl.
*H04W 24/00*          (2009.01)
*H04W 24/02*          (2009.01)
*H04W 24/08*          (2009.01)
*H04W 24/10*          (2009.01)
(Continued)

(52) U.S. Cl.
CPC ........... *H04W 24/08* (2013.01); *H04W 24/00* (2013.01); *H04W 24/02* (2013.01); *H04W 24/10* (2013.01); *H04W 68/00* (2013.01); *H04W 68/02* (2013.01)

(58) Field of Classification Search
CPC ..... H04W 24/08; H04W 24/00; H04W 24/10; H04W 68/00; H04W 68/02
See application file for complete search history.

(56) References Cited

U.S. PATENT DOCUMENTS

| | | | |
|---|---|---|---|
| 2012/0088457 A1* | 4/2012 | Johansson | H04W 24/10 455/67.11 |
| 2016/0135124 A1* | 5/2016 | Vos | H04W 52/0229 370/311 |
| 2017/0181062 A1* | 6/2017 | Kim | H04W 72/30 |

(Continued)

FOREIGN PATENT DOCUMENTS

| | | |
|---|---|---|
| CN | 101931981 A | 12/2010 |
| CN | 106899988 A | 6/2017 |

(Continued)

OTHER PUBLICATIONS

English translation of [WO 2017118220 A1], [Jul. 13, 2017], Retrieved from PE2E Search on [Aug. 4, 2025] (Year: 2017).*

(Continued)

*Primary Examiner* — Omar J Ghowrwal
*Assistant Examiner* — Sanaa Al Samahi
(74) *Attorney, Agent, or Firm* — Cozen O'Connor

(57) ABSTRACT

A method for a drive test, the method including: generating MDT configuration information by an access network device; and sending the MDT configuration information by the access network device; receiving, by a terminal, the MDT configuration information sent by the access network device; and performing, by the terminal, MDT measurement based on the MDT configuration information.

8 Claims, 3 Drawing Sheets

(51) Int. Cl.
    *H04W 68/00*        (2009.01)
    *H04W 68/02*        (2009.01)

(56)                References Cited

U.S. PATENT DOCUMENTS

| | | | | |
|---|---|---|---|---|
| 2019/0261407 A1* | 8/2019 | Irukulapati | ........... | H04W 72/23 |
| 2020/0120622 A1* | 4/2020 | Yoon | .................... | H04B 17/318 |
| 2020/0329503 A1* | 10/2020 | Da Silva | ........... | H04W 74/0838 |
| 2021/0045160 A1* | 2/2021 | Irukulapati | ........... | H04L 5/0051 |
| 2024/0422606 A1* | 12/2024 | Liu | ....................... | H04W 24/10 |

FOREIGN PATENT DOCUMENTS

| | | | | |
|---|---|---|---|---|
| CN | 109474953 A | 3/2019 | | |
| EP | 3117650 A1 | 1/2017 | | |
| WO | WO 2015137656 A1 | 9/2015 | | |
| WO | WO-2017118220 A1 * | 7/2017 | ............ | H04W 68/00 |
| WO | WO-2019047784 A1 * | 3/2019 | ............ | H04W 24/10 |

OTHER PUBLICATIONS

Indian Patent Application No. 202147057434, Office Action dated Apr. 29, 2022, 6 pages.

European Patent Application No. 19928888.7, extended Search and Opinion dated Apr. 25, 2022, 9 pages.

SAMSUNG "Way forward on index based approaches" 3GPP TSG-RAN WG2 #97, R2-1701569; Feb. 2017; 6 pages.

International Patent Application No. PCT/CN2019/086885 International Search Report dated Jan. 21, 2020, 2 pages.

* cited by examiner access network 12

120

120

13 access network device terminal 201, generating MDT configuration information 202, sending the MDT configuration information by the access network device 203, receiving the MDT configuration information sent by the access network device 204, performing, by the terminal, the MDT measurement based on the MDT configuration information

| base station | | terminal |
|---|---|---|

301, generating MDT configuration information 302, sending system information, the system information carrying the MDT configuration information 303, receiving the system information sent by an access network device 304, acquiring the MDT configuration information from the system information 305, determining a terminal needing to perform MDT measurement 306, sending a paging message to the terminal 307, receiving the paging message sent by the base station 308, performing the MDT measurement based on the MDT configuration information when determining needing to perform the MDT measurement based on the indication information 309, reporting a MDT measurement result to the base station 310, performing at least one of rapid RRM, mobility management and beam management based on the MDT measurement result

FIG. 3

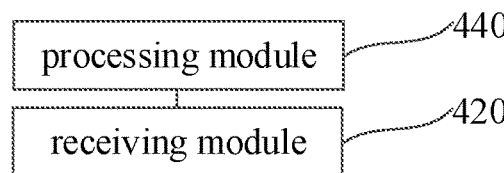

processing module ⟋440 receiving module ⟋420

METHOD, DEVICE AND STORAGE MEDIUM FOR DRIVE TEST

CROSS-REFERENCE TO RELATED APPLICATION

This application is a U.S. national phase of International Application No. PCT/CN2019/086885, filed on May 14, 2019, the entire content of which is hereby incorporated by reference into this disclosure.

TECHNICAL FIELD

The disclosure relates to a field of communications, and particularly to a method, a device and a storage medium for a drive test.

BACKGROUND

Drive test may reflect a network condition of a mobile communication system, and may play a direct role in measuring and evaluating network performance indicators, which helps pinpoint the problems of the network. Conventional network optimization requires drive test personnel to move and measure as much as possible within a network coverage range, and to collect network data such as level and signal quality using a drive test instrument.

Third generation partnership project (3 GPP) defines the minimization of drive tests (MDT) technology. The MDT technology is to acquire related parameters required by network optimization through a measurement report reported by a terminal.

SUMMARY

According to an aspect of the disclosure, a method for a drive test is provided, and the method includes: receiving, by a terminal, MDT configuration information sent by an access network device; and performing, by the terminal, MDT measurement based on the MDT configuration information.

According to an aspect of the disclosure, a method for a drive test is provided, and the method includes: generating MDT configuration information by an access network device; and sending the MDT configuration information by the access network device.

According to an aspect of the disclosure, a terminal is provided, and the terminal includes: a processor; a transceiver connected to the processor; and a memory configured to store instructions executable by the processor. The processor is configured to load and execute the executable instructions to implement the method for a drive test as described in the above aspect.

According to an aspect of the disclosure, an access network device is provided, and the access network device includes: a processor; a transceiver connected to the processor; and a memory configured to store instructions executable by the processor. The processor is configured to load and execute the executable instructions to implement the method for a drive test as described in the above aspect.

According to an aspect of the disclosure, a computer readable storage medium with at least one instruction, at least one program, a set of codes and a set of instructions stored thereon is provided. The at least one instruction, the at least one program, the set of codes or the set of instructions are loaded and executed by the processor to implement the method for a drive test as described in the above aspect.

BRIEF DESCRIPTION OF THE DRAWINGS

In order to explain the technical solutions in embodiments of the present disclosure more clearly, the drawings described in the embodiments will be briefly introduced below. Obviously, the drawings described below are only some embodiments of the present disclosure. Those skilled in the art may obtain other drawings from these drawings without creative work.

FIG. 3 is a flowchart illustrating a method for a drive test according to an example embodiment of the disclosure;

FIG. 4 is a block diagram illustrating an apparatus for a drive test according to an example embodiment of the disclosure;

DETAILED DESCRIPTION

Implementations of the disclosure are further described in combination with the accompanying drawings in order to make the purpose, the technical solutions and advantages of the disclosure more clear.

The communication system and business scenarios described in embodiments of the present disclosure are intended to explain the technical solution of the embodiments of the present disclosure more clearly, and does not constitute a limitation of the technical solution provided by the embodiments of the present disclosure. Those skilled in the art may know that, with the evolution of the communication system and the emergence of new business scenarios, the technical solutions provided in the embodiments of the present disclosure are also applicable to similar technical problems.

Figures 1, 2:
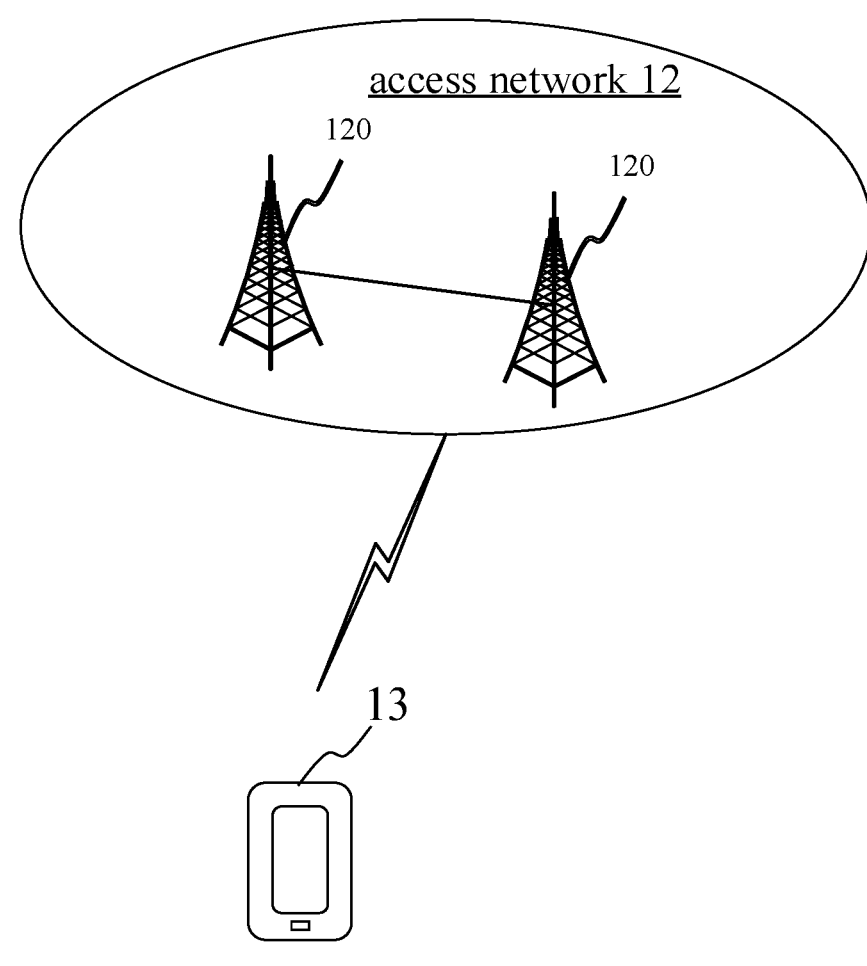
FIG. 1 is a schematic diagram illustrating a communication system supporting sidelink communication provided in an example embodiment of the disclosure.
FIG. 2 is a flowchart illustrating a method for a drive test according to an example embodiment of the disclosure.

FIG. 1 is a block diagram illustrating a communication system provided in some example embodiments of the disclosure. The communication system may include an access network 12 and a terminal 13.

The access network 12 includes multiple access network devices 120. The access network device 120 may be a base station, which is an apparatus deployed in an access network to provide a wireless communication function for a terminal. The base station may include various forms of macro base stations, micro base stations, relay stations, access points, etc. In systems adopting different wireless access technologies, the names of devices with a base station function may be different. For example, in an LTE (long term evolution) system, it is referred to as eNodeB or eNB. In a 5G NR (new radio) system, it is referred to as gNodeB or gNB. With evolution of communication technologies, the term "base station" may vary. For convenience of description, in embodiments of the present disclosure, the above apparatus that provides the wireless communication function for the terminal is collectively referred to as an access network device.

The terminal 13 may include various handheld devices, vehicle devices, wearable devices, computing devices with a wireless communication function or other processing devices connected to a wireless modem, as well as various forms of user equipment (UE), mobile stations (MS), terminal devices, etc. For convenience of description, the above devices are collectively referred to as a terminal. The access network device 120 and the terminal 13 communicate with each other through some kind of air interface technology, for example, a Uu interface.

The minimization of drive tests (MDT) technology defined by a 3GPP is to acquire related parameters required by network optimization based on a measurement report reported by a mobile phone. By means of an MDT technology, following may be realized.

1. Overhead of drive test may be reduced, and an optimization cycle may be shortened, thereby reducing network optimization and maintenance cost of a mobile communication operator.

2. Whole-region measurement information, such as a narrow road, a forest, a private place, etc., that cannot be performed by a conventional drive test may be collected, so that network performance may be evaluated more objectively, making the network evaluation result closer to the user experience, and bringing higher user satisfaction.

3. From the perspective of environmental protection, conventional drive test needs a test vehicle to collect data in a city region. The conventional drive test may be reduced by using the MDT, thus reducing carbon dioxide emission and protecting environment.

To make MDT more efficient, the application scenarios mainly include coverage optimization, capacity optimization, mobility optimization, QoS (quality of service) guarantee, etc.

The current MDT is initiated by OAM (operation administration maintenance), and OAM is in charge of activating an MDT function, and the activation includes the following.

1. MDT activation based on management/region: OAM specifies a specific TA (tracking area)/cell to perform MDT.

2. MDT activation based on signaling: OAM specifies specific UE through an IMSI (International Mobile Subscriber Identity)/IMEI (International Mobile Equipment Identity) to perform MDT.

However, the activation by OAM in a 5G NR may have following problems:

1. A wireless side is unable to acquire UE measurement and location information for fast RRM (radio resource management), mobility and beam management.

2. The time required by an MDT mechanism initiated based on OAM is long, this may bring a certain limitation to a SON (self organized network) function of a network.

FIG. 2 is a flowchart illustrating a method for a drive test according to an example embodiment of the present disclosure. The method may be applied to a communication system as illustrated in FIG. 1. The method includes the following.

At block 201, an access network device generates MDT configuration information.

At block 202, the access network device sends the MDT configuration information.

At block 203, a terminal receives the MDT configuration information sent by the access network device.

At block 204, the terminal performs MDT measurement based on the MDT configuration information.

In summary, with the method provided in the embodiments, a base station issues the MDT configuration information to the terminal, and the terminal performs the MDT measurement based on the MDT configuration information, so that the base station may trigger the MDT measurement in time according to requirements, so as to perform rapid RRM, mobility management and beam management.

The above block 201 and block 202 may be implemented as a method for a drive test at an access network device side, and the above block 203 and block 204 may be implemented as a method for a drive test at a terminal side.

In some alternative embodiments based on FIG. 2, the access network device may send the MDT configuration information to the terminal through system information. The system information includes but not is limited to any of the following ways.

a), Newly adding other SI.

b), Modifying a system information block (SIB) in the related art to obtain a modified SIB, including the following.

(1) A system information block type 1 (SIB1) in minimized SI is modified to obtain a modified SIB1 of minimized SI.

(2) A system information block type 2 (SIB2) of other SI is modified to obtain a modified SIB2 of other SI.

FIG. 3 is flowchart illustrating a method for a drive test according to another example embodiment of the present disclosure. The method may be applied to a communication system as illustrated in FIG. 1. Taking an access network device being a base station as an example, the method includes the following.

At block 301, the base station generates MDT configuration information.

The MDT configuration information is information for configuring MDT measurement. The MDT configuration information includes but is not limited to: region information of MDT measurement, such as a cell or a tracking area; and object parameters of MDT measurement, for example, which parameters are measured.

At block 302, the base station sends system information, the system information carrying the MDT configuration information.

At block 303, a terminal receives the system information sent by an access network device.

At block 304, the terminal acquires the MDT configuration information from the system information.

The block 302 to block 304 may adopt any one of the following three implementations.

First implementation: the MDT configuration information is carried in a SIB X of other SI, the SIB X being a newly added SIB.

The base station sends a SIB1 of minimized SI, the SIB1 carrying first scheduling information. Then, the SIB X of other SI is sent at a position scheduled by the first scheduling information. In some embodiments, the first scheduling information is configured to indicate a broadcast period location of the newly added SIB X in other SI.

Correspondingly, the terminal receives the SIB1 of the minimized SI sent by the base station, and receives the SIB X of other SI based on the first scheduling information in the SIB 1, the SIB X carrying the MDT configuration information. As an example of some embodiments, X is greater than 13.

Second implementation: the MDT configuration information is carried in a modified SIB1 of minimized SI.

The base station sends a SIB1 of minimized SI, the SIB1 carrying the MDT configuration information. Correspondingly, the terminal receives the SIB1 of the minimized SI, reads the SIB1 of the minimized SI, and reads the MDT configuration information from the SIB1.

Third implementation: the MDT configuration information is carried in a modified SIB (for example, a SIB2) of other SI.

The base station sends a SIB1 of minimized SI, the SIB1 carrying second scheduling information. The base station sends the modified SIB of other SI at a position scheduled by the second scheduling information, the modified SIB of other SIB carrying the MDT configuration information. Alternatively, the second scheduling information is configured to indicate a broadcast period position of the modified SIB of other SI. As an example of the embodiment, the modified SIB of other SI is one of SIB2~SIB13.

Correspondingly, the terminal receives the SIB1 of the minimized SI sent by the access network device, and the terminal receives the modified SIB (for example, the SIB2) of other SI based on the second scheduling information in the SIB 1, the SIB carrying the MDT configuration information. The terminal reads the modified SIB of other SI, and reads the MDT configuration information from the modified SIB of other SI.

At block 305, the base station determines a terminal needing to perform MDT measurement.

Since the system information is information that may be received by many terminals, the base station may further determine the terminal needing to perform the MDT measurement.

As an example of the embodiment, the base station determines all terminals in one region (for example, a tracking area or a cell) as terminals needing to perform the MDT measurement. Alternatively, the base station determines all terminals in a certain administrative region as terminals needing to perform the MDT measurement. Alternatively, the base station determines all terminals in a certain narrow road, a certain forest and a certain private place as terminals needing to perform the MDT measurement.

At block 306, the base station sends a paging message to the terminal, the paging message carrying indication information, the indication information being configured to indicate a terminal for performing the MDT measurement.

Alternatively, the indication information carries an identifier of a terminal, that is, a UE ID.

At block 307, the terminal receives the paging message sent by the base station, the paging message carrying the indication information configured to indicate the terminal for performing the MDT measurement.

The terminal determines, based on the indication information in the paging message, whether the terminal itself needs to perform the MDT measurement. In response to needing to perform the MDT measurement, block 308 is performed in response to not needing to perform the MDT measurement, no processing will may performed.

At block 308, when determining needing to perform the MDT measurement based on the indication information, the terminal performs the MDT measurement based on the MDT configuration information.

At block 309, the terminal reports a MDT measurement result to the base station.

At block 310, the base station performs at least one of rapid RRM, mobility management and beam management based on the MDT measurement result.

In summary, with the method provided in the embodiments, the base station issues the MDT configuration information to the terminal, and the terminal performs the MDT measurement based on the MDT configuration information, so that the access network device may trigger the MDT measurement in time according to requirements, so as to perform the fast RRM, the mobility management and the beam management.

The blocks executed by the base station in the above methods may be independently implemented as a method for a drive test at an access network device side, and the blocks executed by the terminal in the above methods may be implemented as a method for a drive test at a terminal side.

FIG. 4 is a block diagram illustrating an apparatus for a drive test according to an example embodiment of the present disclosure. The apparatus may be implemented as all or a part of a terminal by a software, a hardware or a combination thereof. The apparatus includes a receiving module 420 and a processing module 440.

The receiving module 420 is configured to receive MDT configuration information sent by an access network device.

The processing module 440 is configured to perform MDT measurement based on the MDT configuration information.

In an alternative embodiment, the receiving module 420 is configured to receive system information sent by the access network device, the system information carrying the MDT configuration information. The processing module 440 is configured to acquire the MDT configuration information from the system information.

In an alternative embodiment, the MDT configuration information is carried in a SIB X of other SI, the SIB X being a newly added SIB.

The processing module 440 is configured to read the SIB X of other SI, and read the MDT configuration information from the SIB X.

In an alternative embodiment, the MDT configuration information is carried in a modified SIB1 of minimized SI.

The processing module 440 is configured to read the SIB1 of the minimized SI, and read the MDT configuration information from the SIB1 .

In an alternative embodiment, the MDT configuration information is carried in modified other SI.

The processing module 440 is configured to read the modified other SI, and read the MDT configuration information from the modified other SI.

In an alternative embodiment, the receiving module 420 is configured to receive a paging message sent by the access network device, the paging message carrying indication information, the indication information being configured to indicate a terminal for performing the MDT measurement.

The processing module 440 is configured to perform the MDT measurement based on the MDT configuration information when it is determined, based on the indication information, that the MDT measurement needs to be performed.

Figure 5:
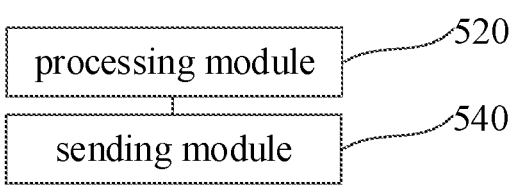
FIG. 5 is a block diagram illustrating an apparatus for a drive test according to an example embodiment of the disclosure.

FIG. 5 is a block diagram illustrating an apparatus for a drive test according to an example embodiment of the present disclosure. The apparatus may be implemented as all or a part of an access network device by a software, a hardware or a combination thereof. The apparatus includes the following.

A processing module 520 is configured to generate MDT configuration information.

A sending module 540 is configured to send the MDT configuration information.

In an alternative embodiment, the sending module 540 is configured to send system information, the system information carrying the MDT configuration information.

In an alternative embodiment, the sending module 540 is configured to send a SIB X of other SI, the SIB X being a newly added SIB, and the SIB X carrying the MDT configuration information.

In an alternative embodiment, the sending module 540 is configured to send a SIB1 of minimized SI, the SIB1 carrying the MDT configuration information.

In an alternative embodiment, the sending module 540 is configured to send modified other SI, the modified other SI carrying the MDT configuration information.

In an alternative embodiment, the processing module 520 is configured to determine a terminal needing to perform MDT measurement.

The sending module 540 is configured to send a paging message to the terminal, the paging message carrying indication information, the indication information being configured to indicate a terminal for performing the MDT measurement.

Figure 6:
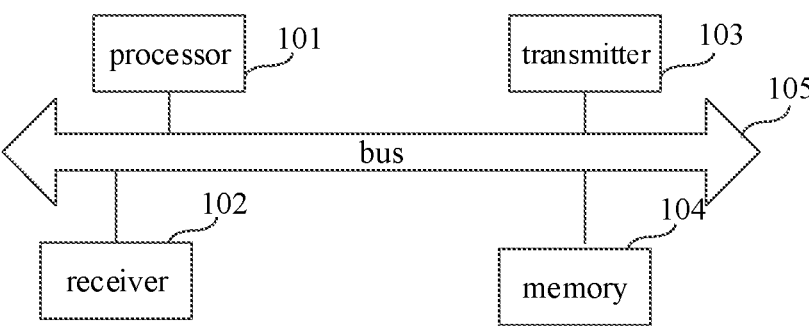
FIG. 6 is a block diagram illustrating a terminal according to an example embodiment of the disclosure.

FIG. 6 is a schematic diagram illustrating a structure of a terminal provided in one example embodiment of the present disclosure. The terminal includes a processor 101, a receiver 102, a transmitter 103, a memory 104 and a bus 105.

The processor 101 includes one or more processing cores, and the processor 101 executes various function applications and information processing by running software programs and modules.

The receiver 102 and the transmitter 103 may be implemented as a communication component, which may be a communication chip.

The memory 104 is connected to the processor 101 through the bus 105.

The memory 104 may be configured to store at least one instruction, and the processor 101 is configured to execute the at least one instruction to implement various actions in the above method embodiments.

In addition, the memory 104 may be implemented by any type of temporary or non-temporary storage devices or their combination. The temporary or non-temporary storage devices include but are not limited to a magnetic disk or an optical disk, an electrically erasable programmable read-only memory (EEPROM), an electrically programmable read-only memory (EPROM), a static random access memory (SRAM), a read-only memory (ROM), a magnetic memory, a flash memory, a programmable read-only memory (PROM).

In some example embodiments, a non-transitory computer readable storage medium including instructions is further provided, such as a memory including instructions. The above instructions may be executed by the processor of the terminal to implement the above methods for a drive test. For example, the non-transitory computer readable storage medium may be a ROM, a random access memory (RAM), a CD-ROM, a magnetic tape, a floppy disk, an optical data storage device, etc.

A non-transitory computer readable storage medium is further provided. When the instructions in the non-transitory computer readable storage medium are executed by the processor of the terminal, the terminal is caused to execute the method for a drive test.

Figure 7:
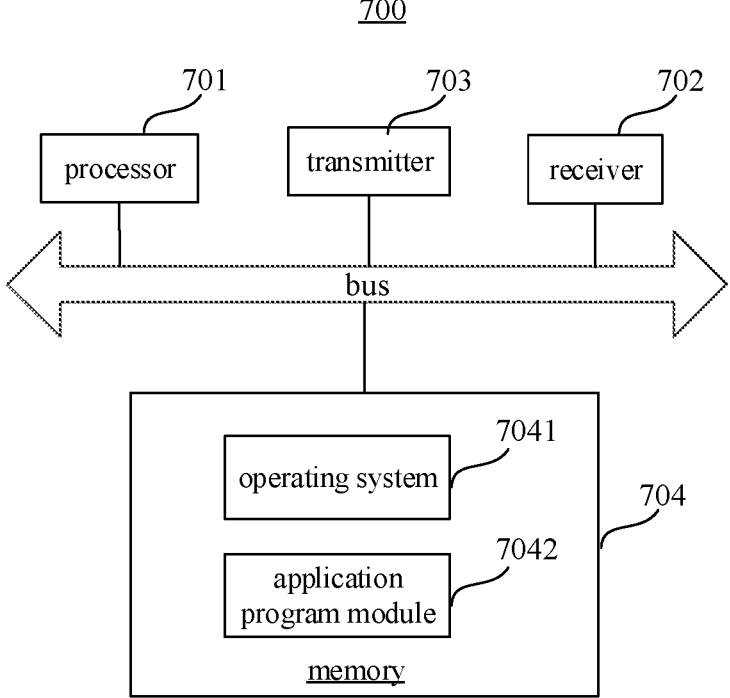
FIG. 7 is a block diagram illustrating an access network device according to an example embodiment of the disclosure.

FIG. 7 is a block diagram illustrating an access network device (a base station) 700 according to an example embodiment.

The access network device 700 may include a processor 701, a receiver 702, a transmitter 703 and a memory 704. The receiver 702, the transmitter 703 and the memory 704 are connected to the processor 701 through a bus respectively.

The processor 701 includes one or more processing cores, and the processor 701 executes the methods executed by the access network device in the method for a drive test provided in embodiments of the disclosure by running software programs and modules. The memory 704 may be configured to store software programs and modules. Specifically, the memory 704 may store an operating system 7041, and an application program module 7042 required by at least one function. The receiver 702 is configured to receive communication data sent by other devices, and the transmitter 703 is configured to send communication data to other devices.

An example embodiment of the disclosure further provides a system for a drive test, and the system includes a terminal and an access network device.

The terminal includes an apparatus for a drive test according to the embodiment as illustrated in FIG. 4. The access network device includes an apparatus for a drive test in the embodiment as illustrated in FIG. 5.

Alternatively, the terminal includes a terminal provided in the embodiment as illustrated in FIG. 6, and the access network device includes an access network device provided in the embodiment as illustrated in FIG. 7.

An example embodiment of the disclosure further provides a computer readable storage medium with at least one instruction, at least one program, a set of codes and a set of instructions stored thereon. The at least one instruction, the at least one program, the set of codes or the set of instructions are loaded and executed by the processor to implement the actions executed by the terminal in the method for a drive test or the actions executed by the access network device in the method for a drive test as described in the above method embodiments.

Those skilled in the art may understand that all or part of actions in the above method embodiments may be implemented by hardware or by instructing relevant hardware by a program. The program may be stored in a computer readable storage medium, and the above-mentioned storage medium may be a read-only memory, a magnetic disk or an optical disc, etc.

The above descriptions are only preferred embodiments of the disclosure and are not configured to limit the disclosure. Any modification, equivalent replacement, improvement etc. made within the spirit and principles of the disclosure shall be included in the protection scope of the disclosure.

What is claimed is:

1. A method for a drive test, comprising:
   receiving, by a terminal, minimization of drive tests (MDT) configuration information sent by an access network device; and
   performing, by the terminal, MDT measurement based on the MDT configuration information;
   wherein receiving by the terminal the MDT configuration information sent by the access network device comprises:
   receiving, by the terminal, system information sent by the access network device, the system information carrying the MDT configuration information; and
   acquiring, by the terminal, the MDT configuration information from the system information;
   wherein the MDT configuration information is carried in a modified SIB1 of minimized SI;
   wherein acquiring by the terminal the MDT configuration information from the system information comprises:
   reading, by the terminal, the modified SIB1 of the minimized SI, and reading the MDT configuration information from the modified SIB1.

2. The method of claim 1, wherein performing by the terminal the MDT measurement based on the MDT configuration information comprises:

receiving, by the terminal, a paging message sent by the access network device, the paging message carrying indication information, the indication information being configured to indicate a terminal for performing the MDT measurement; and performing the MDT measurement based on the MDT configuration information in response to determining, based on the indication information, that the MDT measurement needs to be performed.

3. A non-transitory computer readable storage medium with at least one instruction, at least one program, a set of codes or a set of instructions stored therein, wherein the at least one instruction, the at least one program, the set of codes or the set of instructions are loaded and executed by a processor to implement the method of claim 1.

4. A method for a drive test, comprising:

generating MDT configuration information by an access network device; and sending the MDT configuration information by the access network device;

wherein, sending the MDT configuration information by the access network device, comprises:

sending a modified SIB 1 of minimized SI by the access network device, the SIB1 carrying the MDT configuration information.

5. The method of claim 4, further comprising:

determining, by the access network device, a terminal needing to perform MDT measurement; and sending a paging message to the terminal by the access network device, the paging message carrying indication information, the indication information being configured to indicate a terminal for performing the MDT measurement.

6. An access network device, comprising:

a processor; and a transceiver connected to the processor; and a memory configured to store instructions executable by the processor;

wherein, the processor is configured to load and execute the executable instructions to implement the method of claim 4.

7. A terminal, comprising:

a processor; and a transceiver connected to the processor; and a memory configured to store instructions executable by the processor;

wherein, the processor is configured to load and execute the executable instructions to implement a method for a drive test, the method comprising:

receiving MDT configuration information sent by an access network device; and performing MDT measurement based on the MDT configuration information;

wherein receiving the MDT configuration information sent by the access network device comprises:

receiving system information sent by the access network device, the system information carrying the MDT configuration information; and acquiring the MDT configuration information from the system information;

wherein the MDT configuration information is carried in a modified SIB1 of minimized SI;

wherein acquiring the MDT configuration information from the system information comprises:

reading the modified SIB1 of the minimized SI, and reading the MDT configuration information from the modified SIB1.

8. The terminal of claim 7, wherein performing the MDT measurement based on the MDT configuration information comprises:

receiving a paging message sent by the access network device, the paging message carrying indication information, the indication information being configured to indicate a terminal for performing the MDT measurement; and performing the MDT measurement based on the MDT configuration information in response to determining, based on the indication information, that the MDT measurement needs to be performed.

* * * * *